United States Patent [19]
Noonan et al.

[11] Patent Number: 6,129,157
[45] Date of Patent: Oct. 10, 2000

[54] BYPASS SYSTEM FOR ELECTRONICALLY CONTROLLED IMPLEMENT LIFT

[75] Inventors: James Thomas Noonan, Johnston; Paul David Parker, Ankeny, both of Iowa

[73] Assignee: Deere & Company, Moline, Ill.

[21] Appl. No.: 09/370,844

[22] Filed: Aug. 10, 1999

[51] Int. Cl.$^7$ .................................................. A01B 63/114

[52] U.S. Cl. ........................................... 172/239; 172/311

[58] Field of Search ..................................... 172/239, 311, 172/4, 2

[56] References Cited

U.S. PATENT DOCUMENTS 3,663,032  5/1972  Hook et al. .
5,957,218  9/1999  Noonan et al. .......................... 172/239

OTHER PUBLICATIONS

Deere & Company, Technical Manual 1576, p. 270-25-48, publication date—Jul. 1, 1999, published in U.S.A.

Primary Examiner—Christopher J. Novosad

[57] ABSTRACT

An implement lift with a plurality of individual electrohydraulically controlled lift cylinders spaced on a tool frame includes a bypass system for facilitating continued implement operation in the event of a failure of the electronics or wiring. The system includes an electrically controlled valve at each cylinder normally operated by an electronic controller but manually lockable in an open position if there is a circuit failure so the operator can control the implement from the tractor selective control valve (SCV). Hydraulic hoses with quick disconnects compatible with both the tractor SCV connections and the main electrohydraulic valve on the tractor are connected to the tractor valve for normal automatic operation but can be easily rerouted to the SCV connections for control by the SCV when the cylinder valves are manually locked in the open position.

20 Claims, 2 Drawing Sheets

BYPASS SYSTEM FOR ELECTRONICALLY CONTROLLED IMPLEMENT LIFT

BACKGROUND OF THE INVENTION

1) Field of the Invention

The present invention relates generally to agricultural implements, and, more specifically, to control of hydraulic depth control cylinders for such implements.

2) Related Art

Most available multi-frame implements such as field cultivators and chisel plows use a hydraulic cylinder system to provide depth control during field-working operations and adequate ground clearance during transport. Some depth control systems such as shown in U.S. Pat. No. 3,663,032 use rephasing cylinders connected in series to raise and lower the frames in unison. Other systems rely on mechanical depth stops to control operating height, but do not allow the operator to change that height from the cab or to easily vary depth for different transport conditions, ground contours and soil conditions. In addition, both the series cylinder and the mechanical depth stop systems require mechanical adjustment outside the cab to adjust the height of wing frames relative to the main or center frame. Adequate level control for fore-and-aft frame leveling or tilt and for leveling from side to side have presented problems.

In copending and commonly assigned U.S. application Ser. No. 08/972,925 filed Nov. 18, 1997 and entitled Electrohydraulic Control of Implement Lift Cylinders, we describe an improved lift system including a plurality of individual electrohydraulically controlled cylinders spaced on a tool frame and connected to frame suspension structure such as lift wheel assemblies. An implement control unit (ICU) in the towing vehicle cab is connected to feedback potentiometers or similar transducers which provide signals corresponding to cylinder stroke length or suspension position. The feedback signals are compared at the ICU to a control signal obtained by rotation of a lever or knob on an operator control unit in the cab. Depending on the cylinder position relative to the operator selected position, the ICU provides an output signal to the electrohydraulic valve to achieve a proportional amount of flow for the desired cylinder position. The ICU also compares feedback signals from the transducers and adjusts the output voltage to each of the valves so that the frame can be raised and lowered evenly. In conditions where independent adjustment of different frame portions is desired, the operator control unit can be adjusted to provide the necessary offset signal for each section. The lift system provides uniform depth control and level lift, even with dissimilar cylinders with different capacities and stroke lengths. Level lift and depth control can be achieved, relative to both the fore-and-aft and transverse directions.

One problem with an implement utilizing electronic controls is the inability to continue operations or to lift the implement for transport without a time consuming repair or an extensive replumbing of hydraulic hoses if there is a failure in the electronics, wiring harness or electrohydraulic valves. It is desirable to have a simple structure and straightforward, efficient method for continued operation of the implement in the event of such a failure.

BRIEF SUMMARY OF THE INVENTION

It is therefore an object of the present invention to provide an improved implement lift or depth control system. It is a further object to provide such an improved system which overcomes most or all of the aforementioned problems.

It is a further object of the present invention to provide an improved implement lift or depth control system which includes structure facilitating continued implement operation in the event of failure of an electronic component, wiring or electrohydraulic valve. It is yet another object to provide such a system which is relatively simple in construction and easy to convert to a manual bypass mode of operation in the event of a component failure. It is still another object to provide such a system wherein conversion to the bypass mode allows continued field operation of the implement; it is a further object to provide such a system wherein lift and depth control functions are provided in the bypass mode.

It is still another object of the invention to provide an improved implement lift system having automatic electronic control of lift cylinders, wherein the system can be easily converted to a manual control mode if the electronic control fails. It is another object to provide such a system which utilizes electrohydraulic control valves, the control valves having a bypass for operation of the cylinders from the tractor selective control valve (SCV).

An implement lift and depth control system with a plurality of individual electrohydraulically controlled lift cylinders spaced on a tool frame includes a bypass system for facilitating continued implement operation in the event of a failure of the electronics or wiring. The system includes electrically controlled cylinder valves normally operated by an electronic controller and manually lockable in an open position if there is a circuit failure so the operator can control the implement from the tractor SCV. In systems having an add-on electrohydraulic valve controlled by the ICU, hydraulic hoses with quick disconnects compatible with both the tractor SCV connections and the add-on valve can be easily rerouted to the SCV connections for control by the SCV when the cylinder valves are manually locked in the open position. Down stops such cylinder donuts or other mechanical structure are provided on the implement for conventional depth control when automatic control is bypassed. The operator simply activates a manual control on each valve which locks the valve in the open position. A mechanical stop arrangement, such as donuts placed over the cylinder rod, determines the operating depth. Failure of the electronics, wiring harness or control valve no longer dictates that the farmer immediately stop field operations for repairs.

These and other objects, features and advantages of the present invention will become apparent to one skilled in the art upon reading the following detailed description in view of the drawings.

DETAILED DESCRIPTION OF THE DRAWINGS

Figures 1, 2:
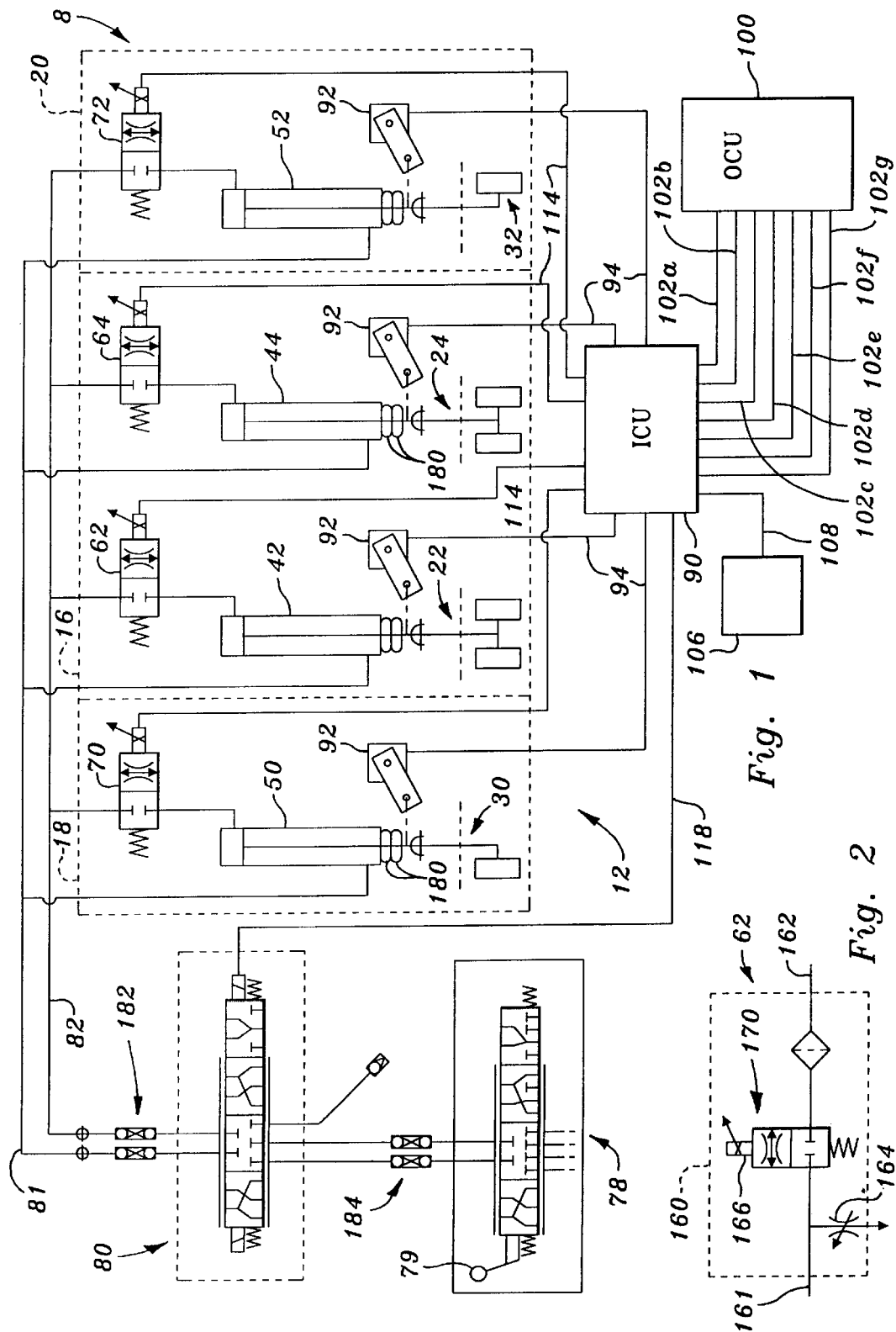
FIG. 1 is a schematic representation of an electronically controlled lift and depth control system on an agricultural implement.
FIG. 2 is a schematic diagram of a valve with a manually operated bypass utilized with the system of FIG. 1.

Referring now to FIG. 1, therein is shown generally at 8 an implement with earthworking tools (not shown) supported from a transversely extending frame 12. The frame 12 includes a center frame or section 16 and wing sections 18 and 20 pivotally connected to the center section 16 for pivoting relative to the center section about fore-and-aft extending axes. First and second center frame lift assemblies 22 and 24 are connected to the section 16. The wing sections 18 and 20 include wing lift assemblies 30 and 32. Hitch structure (not shown) is pivotally supported from the forward portion of the frame 16 for connection to a tractor for towing the implement 10 forwardly over a field.

Individual electrohydraulically controlled cylinders 42 and 44 are spaced on the frame 12 and connected to the lift wheel assemblies 22 and 24. Cylinders 50 and 52 located on the wings sections 18 and 20 are connected to the wing lift assemblies 30 and 32. As shown in FIG. 1, the cylinders are controlled by individual electrohydraulic control valves 62, 64, 70 and 72. The valves 62–72 are shown as two position, four way proportional valves connected between the base ends of the cylinders and a source of hydraulic fluid under pressure on the tractor 78 via selective control valve (SCV) 79. The cylinders 42–52 are connected through implement valve structure 80 via hydraulic lines 81 and 82. The implement valve structure 80 is shown as a separate add-on valve in FIG. 1 but it is to be understood that the structure may also be integral with the tractor, such as exemplified on the commercially available John Deere 8000 and 9000 series tractors.

An implement control unit (ICU) 90 is connected to feedback potentiometers 92 or similar transducers which provide signals via lines 94 corresponding to cylinder stroke length or suspension position. An operator control unit (OCU) 100 is connected through control lines 102a–102g to the ICU 90. A remote paddle potentiometer 106 provides raise/lower signals via line 108. On tractors such as the John Deere 8000 and 9000 series tractor with integral implement valve structure 80, the needed signals are transmitted through the tractor bus before being interpreted by a display and sent to the ICU 90 without need for the potentiometer 106. The OCU 100 has standard operator adjusted inputs and provides the following outputs (which are indicated as lines 102a through 102g on FIG. 1), the indicated lines dependent on the adjusted inputs:

| | |
|---|---|
| 102(a) | Intermediate depth control voltage signal; |
| 102(b) | Depth voltage signal; |
| 102(c) | Left wing depth offset; |
| 102(d) | Right wing depth offset; |
| 102(e) | Main frame level; |
| 102(f) | Offset disable; and |
| 102(g) | Power source. |

The ICU 90 compares the voltage on the line 94 for each lift assembly with a desired signal voltage for that lift assembly. The ICU 90 also compares the signal voltage for each lift assembly with the signal voltages of the other lift assemblies to raise and lower the machine evenly and to provide any desired leveling and tilt functions.

The OCU 100 includes a level reference control and a zero reference control. A depth control and intermediate depth control establish the working depth in the field-working positions. A right wing offset control and a left wing offset control facilitate adjustment of the wings 18 and 20 relative to the center frame 16. A mainframe level control adjusts the height of the left side of the center frame relative to the right side of the frame 16. An enable/disable switch facilitates resetting of the positions. The OCU 100 includes a digital readout of the selected working depth. The depth controls may include variable resistors with rotatable knobs having detents for various operating conditions and for convenient return to a preselected level setting after the offset control feature has been utilized. Alternatively, buttons or membrane switches to provide an increment signal for the offset control feature may be used.

The intermediate control position can be set at any desired level between the working depth and the fully raised position. The intermediate depth control position, for example, can be set to maintain the frame 12 to a position where the tools 10 shallowly engage the soil when removing tire tracks without deep tillage or when turning around when the tools 10 do not have to be lifted completely out of the ground. The intermediate control is also useful when the implement is moving over ground irregularities such as gullies or waterways.

Control output lines 114 from the ICU 90 selectively power the electrohydraulic valves 62–72 to operate the cylinders 42–50 and provide the desired lift and depth control functions. A control line output 118 provides automatic control from the ICU 100 for the valve structure 80 to pressurize the hydraulic line 82 so operation of one or more of the valves 62–72 extends the corresponding cylinder or cylinders when lift is required. The line 82 is returned to sump when implement lowering is required. Alternatively, four position, four way valves may be used so the direction control is provided directly by the valves 62–72 without requiring pressure reversal in the lines 81 and 82. Two position, two way valves may also be used with the system. In addition, on-off type of valves may be substituted for the proportional valves.

The feedback signals from the lines 94 are compared at the ICU 90 to a control signal obtained by button operation or rotation of a lever or knob on the OCU 100. Depending on the cylinder position relative to the operator selected position, the ICU 90 provides an output signal to the electrohydraulic valve to achieve a proportional amount of flow for the desired cylinder position. The ICU 90 also compares feedback signals from the transducers and adjusts the output voltage to each of the valves so that the frame 12 can be raised and lowered evenly. In conditions where independent adjustment of different frame portions is desired, the OCU 100 can be adjusted to provide the necessary offset signal for each section. The lift system provides uniform depth control and level lift, even with dissimilar cylinders with different capacities and stroke lengths. Additional wheel assemblies may be offset in the fore-and-aft direction from the assemblies 22 and 24 and controlled by the ICU and OCU to provide front to back leveling.

The lift assemblies move the frame 12 between a raised transport position wherein the tools 10 are offset a substantial distance above the ground and a lowered field-working position wherein the tools 10 penetrate the ground. In the field-working position, the wheel assembly cylinders can be extended or retracted to adjust the depth of penetration of the tools 10 from a shallow skimming position to a lowermost deep tillage position. The wheel assembly cylinders can be adjusted in any frame position to vary the wing positions relative to the position of the center section 16 and to level the frame or vary section height from side-to-side and from front to rear.

The ICU 90 reads the analog inputs from the transducers 92 for control of the individual lift cylinders. Also, a valve control signal is provided via line 118 from the ICU to 10 the add-on implement control valve 80 (or directly to the integrated SCV unit on the newer tractors). The source 78 includes a standard manually operated SCV 200. On the newer tractors, the source 78 is controlled from the ICU and from conventional setup controls 200 and a standard SCV lever located in the tractor cab.

Figure 3:
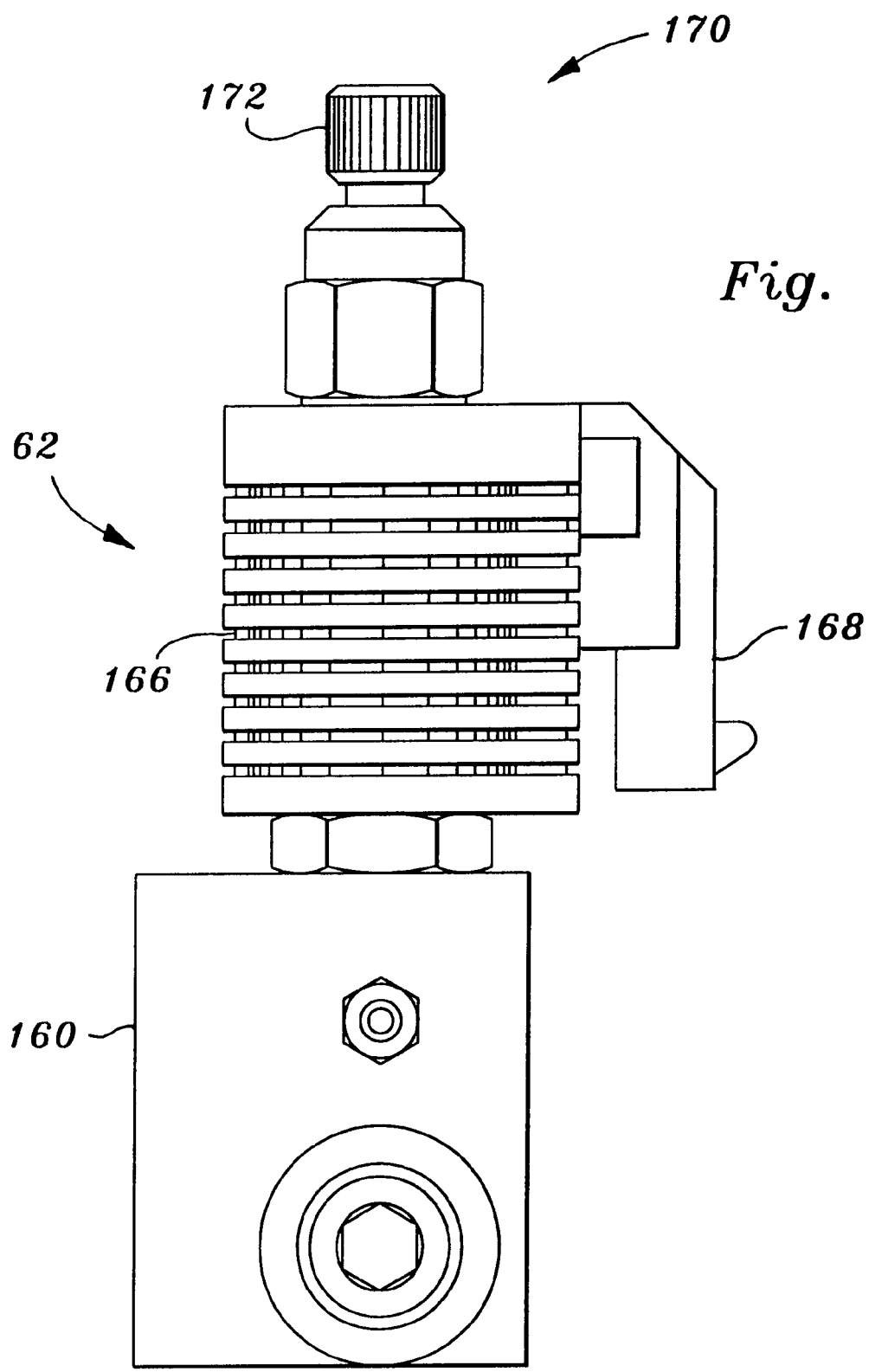
FIG. 3 is a side view of an electrohydraulic valve with a manually operated bypass lock.

The electrohydraulic valves 62–72 are generally identical and so only the valve 62 will be described in detail. Referring to FIGS. 2 and 3, the valve 62 includes a body with an input port 161 and an output port 162 which is connected to the base end of the corresponding cylinder. A bleed screw 164 is located at the output side of the valve. A solenoid 166 with a connector 168 controls the two position, four way valve to connect the base end of the cylinder to the line 82 and to adjust flow through the valve. A valve lock-out 170 including a knob 172 is located at the top of the solenoid. To lock the valve 62 in the fully open position, the operator depresses the lock-out and then rotates the knob 172 a quarter turn in the clockwise direction. Alternatively, any type of mechanical lock-out arrangement, such as a lever or threaded screw, may be used to maintain the valve in the fully open position. The valve will remain in the fully open position held by the lock-out 170 regardless of the signal on the line 94. To return to automatic operation, the operator simply rotates the knob a quarter turn in the counterclockwise direction and releases the knob 172 so the valve spool can move from the locked on position to a position dependent on the signal on the line 94. Therefore, if an electrical failure occurs, the operator can lock all the valves 62–72 in the open position and control the lift and lower functions directly with the tractor SCV 79. Donuts 180 for the cylinder rods or other mechanical stops on or associated with the lift assemblies provide depth control. If the add-on implement control 80 is used, the control is bypassed by disconnecting the lines 81 and 82 from the control at connector locations 182 and reconnecting them to connectors at locations 184 at the SCV output from the source 78. Identical connectors are provided at both locations 182 and 184 to facilitate changes to and from the bypass mode of operation.

In operation, after the operator has attached the implement 8 to the tractor and connected the hydraulic lines 81 and 82 between the implement and the tractor, the SCV setup is activated and the implement is moved to a level surface. The SCV lever is moved to raise the wheels from the ground and then the lever is placed in the float position so the wheel assemblies contact the level surface. The operator then pushes the level reference control to establish the voltage reference levels from the transducers 92 corresponding to the level reference position. The implement is then raised and towed to the field where the frame 12 is lowered until the tools make contact with the surface. The zero reference control is depressed to establish a zero level reference for the particular field conditions. The operator then lowers the machine to the desired working depth and depresses a button to establish a working depth setting. Alternatively, a knob may be used which the operator turns until the desired operating depth is indicated on the digital readout. Initially, the right and left wing offsets and the center level control are set for level operation. The SCV lever is activated and the implement wheel assemblies lower the frame 12 under the control of the ICU 90. The ICU receives the transducer voltage signals and controls the individual electrohydraulic valves to retract the cylinders to assure level lowering. Once the implement 8 is operating in the field, the wing controls can be moved from their detent positions to provide an offset voltage to raise or lower a wing section 18 or 20 independently of the center section 16 for better level control. If for any reason one side of the center section 16 is operating at a different level than the opposite side, the level control can be moved to provide an offset voltage to change the positions of the wheel assemblies 22,30 relative to the assemblies 24,32 in the direction level the section.

If an intermediate depth control is desired, for example, during turnarounds or when passing over a waterway, the operator simply activates the intermediate depth control. Multiple detents can also be provided to establish easily selectable working depths for different conditions.

To raise the implement 8, the operator selects the raise function at the SCV 200, and the feedback system assures that the cylinders extend generally in unison to raise the implement in a level condition. The offset control provides reference level reset and an override for normal SCV operation without depth and offset controls.

If a failure occurs in the controllers, electrohydraulic valves or wiring harness, the operator can continue operation by locking all the valves 62–72 in the open position, attaching or activating the mechanical stops 180, and bypassing the add-on implement valve 80, if utilized, by disconnecting the lines 81 and 82 from the location 182 and reconnecting them at the location 184 for direct control of the cylinders from the tractor SCV 79.

Having described the preferred embodiment, it will become apparent that various modifications can be made without departing from the scope of the invention as defined in the accompanying claims.

We claim:

1. In an agricultural implement having a transversely extending tool-supporting frame with forward and aft portions and adapted for movement forwardly over the ground by a towing vehicle and supported by a plurality of transversely spaced lift assemblies for raising and lowering the frame relative to the ground, a lift control system comprising:

hydraulic cylinders connected to the lift assemblies;
   control valve structure connected to the hydraulic cylinders and to a source of hydraulic fluid under pressure selectively operable to extend and retract the hydraulic cylinder to operate the lift assemblies to raise and lower the frame;
   transducer members responsive to operation of the lift assemblies and providing output signals dependent upon the position of the frame;
   an electronic control unit connected to the control valve structure and the transducers and responsive to the transducer output signals to individually operate the hydraulic cylinders for positioning the frame at a preselected position relative to the ground; and
   bypass structure facilitating operation of the cylinders independently of the electronic control unit.

2. The lift control system as set forth in claim 1 wherein the control valve structure comprises an electrohydraulic valve connected between the source and each of the cylinders and the bypass structure includes a manual control on the electrohydraulic valve.

3. The lift control system as set forth in claim 2 wherein the electrohydraulic valve comprises a proportional valve for providing a flow of fluid dependent upon the output signals of the transducers.

4. The lift control system as set forth in claim 1 wherein the transducer members include a transducer providing a voltage dependent on extension of the cylinders.

5. In an implement adapted for forward movement over the ground and including a transversely extending frame supporting earthworking tools, lift assemblies supported from the frame and selectively positionable to raise and lower the tools between raised transport positions and lowered field-working positions and to vary the location of the earthworking tools when the tools are in the field-working position, the lift assemblies including individual hydraulic cylinders, a lift control system comprising:

electrohydraulic valve structure connected to the hydraulic cylinders;

a source of hydraulic fluid under pressure;

a selective control valve (SCV) connecting the source to the electrohydraulic valve structure;

transducers providing transducer signals dependent on the position of each of the lift assemblies;

an operator control unit (OCU) for providing desired position signals;

an implement control unit (ICU) having inputs connected to the transducers and to the OCU, and outputs connected to the electrohydraulic valve structure, wherein the ICU is responsive to the transducer signals and desired position signals for automatic controlling the valve structure to individually control the hydraulic cylinders and maintain the tools at desired positions relative to the ground; and wherein the electrohydraulic valve structure includes a lock-out for operation of the hydraulic cylinders independently of the ICU so that the lift control can be operated by the SCV if automatic control is interrupted by an electrical failure in the lift control system.

6. The lift control system as set forth in claim 5 wherein the valve structure comprises a two way, four position valve.

7. The lift control system as set forth in claim 6 wherein the lock-out includes a control manually movable to lock the valve in an open position.

8. The lift control system as set forth in claim 6 wherein the valve structure comprises a proportional valve.

9. The lift control system as set forth in claim 5 including an electrically controlled implement valve connected to the ICU and located between the source and the electrohydraulic valve structure, and further including connector structure for bypassing the implement valve for direct operation of the hydraulic cylinders by the SCV.

10. In an implement adapted for forward movement over the ground and including a transversely extending frame supporting earthworking tools, lift assemblies supported from the frame and selectively positionable to raise and lower the tools between raised transport positions and lowered field-working positions and to vary the location of the earthworking tools when the tools are in the field-working position, the lift assemblies including individual hydraulic cylinders, a lift control system comprising:

electrohydraulic valve structure connected to the hydraulic cylinders;

a source of hydraulic fluid under pressure;

control valve structure connecting the source to the electrohydraulic valve structure;

transducer structure providing transducer signals dependent on the position of each of the lift assemblies;

an implement control responsive to the transducer signals and connected to the electrohydraulic valve structure and providing automatic control of the valve structure to control the hydraulic cylinders and maintain the tools at desired positions relative to the ground; and bypass structure connected to the electrohydraulic valve structure and having a first position facilitating the automatic control and a second position facilitating manual control of the cylinders from the control valve structure.

11. The lift control system of claim 10 wherein the electrohydraulic valve structure comprises a valve body supporting a valve spool having an open position and a closed position, the bypass including a locking member securing the spool in the open position.

12. The lift control system as set forth in claim 10 wherein the electrohydraulic valve structure includes a proportional valve and the locking member secures the valve spool in a fully open position.

13. The lift control system as set forth in claim 10 wherein the electrohydraulic valve structure comprises a two position, two way proportional valve.

14. The lift control system as set forth in claim 10 wherein the electrohydraulic valve structure comprises a four position, four way valve.

15. The lift control system as set forth in claim 10 wherein the electrohydraulic valve structure comprises a two position, four way valve.

16. The lift control system as set forth in claim 10 wherein the electrohydraulic valve structure comprises an on-off type of valve.

17. The lift control system as set forth in claim 10 wherein the electrohydraulic valve structure includes a solenoid supported from the valve body, and the locking member moves the solenoid to a position corresponding to the open position of the valve spool.

18. The lift control system as set forth in claim 10 wherein the control valve structure comprises an implement control valve operably connected to the implement control, and a selective control valve connected to the implement control valve, the lift control system further comprising hydraulic line structure providing bypass of the implement control valve when the manual control of the cylinders is facilitated.

19. In an implement adapted for forward movement over the ground and including a transversely extending frame supporting earthworking tools, lift assemblies supported from the frame and selectively positionable to raise and lower the tools between raised transport positions and lowered field-working positions and to vary the location of the earthworking tools when the tools are in the field-working position, the lift assemblies including individual hydraulic cylinders, a lift control system comprising:

a source of hydraulic fluid under pressure;

valve structure connected to the hydraulic cylinders and the source of hydraulic fluid under pressure;

an implement control connected to the valve structure to automatically control the hydraulic cylinders; and wherein the valve structure includes a lock-out selectively securing the valve structure in an open position so the hydraulic cylinders can be operated from the source independently of the implement control.

20. The lift control system as set forth in claim 19 wherein the valve structure includes a solenoid operated valve having an open position and a closed position, the lock-out maintaining the valve in the open position regardless of the state of the solenoid.

\* \* \* \* \*